(12) United States Patent
Shahi

(10) Patent No.: US 10,103,668 B2
(45) Date of Patent: *Oct. 16, 2018

(54) MOTOR CONTROL SYSTEM AND METHOD FOR SKIPPING RESONANT OPERATING FREQUENCIES

(71) Applicant: NIDEC MOTOR CORPORATION, St. Louis, MO (US)

(72) Inventor: Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,681

(22) Filed: Oct. 17, 2016

(65) Prior Publication Data

US 2017/0033718 A1 Feb. 2, 2017

Related U.S. Application Data

(63) Continuation of application No. 14/456,728, filed on Aug. 11, 2014, now Pat. No. 9,473,060.

(51) Int. Cl.
| | |
|---|---|
| F04B 49/20 | (2006.01) |
| H02P 23/04 | (2006.01) |
| F04B 49/06 | (2006.01) |
| G05B 1/00 | (2006.01) |
| H02P 29/10 | (2016.01) |
| F04D 25/06 | (2006.01) |

(Continued)

(52) U.S. Cl.
CPC ............ *H02P 23/04* (2013.01); *F04B 49/065* (2013.01); *F04B 49/20* (2013.01); *F04D 25/06* (2013.01); *F04D 25/08* (2013.01); *F04D 27/004* (2013.01); *G05B 1/00* (2013.01); *G05B 1/01* (2013.01); *G05B 13/021* (2013.01); *H02P 6/06* (2013.01); *H02P 29/10* (2016.02); *G05B 2219/42339* (2013.01)

(58) Field of Classification Search
CPC ........ H02P 23/04; H02P 29/0005; H02P 6/06; F04B 49/20; F04B 49/065
See application file for complete search history.

(56) References Cited

U.S. PATENT DOCUMENTS

| | | | | |
|---|---|---|---|---|
| 5,592,059 A | * | 1/1997 | Archer | ................. F24F 11/0009 318/400.08 |
| 6,220,045 B1 | * | 4/2001 | Kim | ..................... F25B 49/025 62/228.4 |

(Continued)

*Primary Examiner* — Muhammad S Islam
(74) *Attorney, Agent, or Firm* — Hovey Williams LLP

(57) ABSTRACT

A system and method of avoiding hunting behavior by a motor around disallowed speed ranges. A sensor or sensorless method determines the motor's actual speed. A memory contains lower and upper speed values that define a disallowed range. A control unit determines whether the motor is operating under a limiting condition and engaged in hunting behavior by determining whether the motor is repeatedly moving between an actual speed that is within the disallowed range and an actual speed that is at or below the lower speed value during a first period, and if so, sets a temporary speed limit for the motor at the lower speed value for a second period. The first period may be the time required for the motor to change its actual speed a few times and thereby confirm hunting behavior. The second period may be sufficiently long that the limiting condition may have changed.

16 Claims, 6 Drawing Sheets

(51) Int. Cl.
  *F04D 25/08* (2006.01)
  *F04D 27/00* (2006.01)
  *G05B 1/01* (2006.01)
  *G05B 13/02* (2006.01)
  *H02P 6/06* (2006.01)

(56) References Cited

U.S. PATENT DOCUMENTS

| | | | |
|---|---|---|---|
| 7,952,308 B2* | 5/2011 | Schulz | H02P 6/10 318/400.07 |
| 2005/0254959 A1* | 11/2005 | Furuta | F04D 27/004 417/46 |
| 2006/0290304 A1* | 12/2006 | Marcinkiewicz | H02P 6/205 318/432 |
| 2007/0096665 A1* | 5/2007 | Ku | G06F 1/206 318/66 |
| 2008/0310967 A1* | 12/2008 | Franz | F04D 27/004 417/32 |
| 2009/0093911 A1* | 4/2009 | Caillat | F04B 39/0027 700/280 |
| 2009/0128070 A1* | 5/2009 | Brown | H02P 6/002 318/400.13 |
| 2010/0244755 A1* | 9/2010 | Kinugasa | B60L 15/025 318/400.23 |
| 2010/0270957 A1* | 10/2010 | Li | H02P 6/085 318/400.26 |
| 2012/0168140 A1* | 7/2012 | Yokkoyama | B60L 1/003 165/271 |

* cited by examiner

MOTOR CONTROL SYSTEM AND METHOD FOR SKIPPING RESONANT OPERATING FREQUENCIES

RELATED APPLICATIONS

The present U.S. non-provisional patent application is a continuation and claims priority benefit of an earlier filed U.S. non-provisional patent application having the same title, Ser. No. 14/456,728, filed Aug. 11, 2014. The entire content of the identified earlier-filed application is incorporated by reference as if fully set forth herein.

FIELD

The present invention relates to systems and methods for controlling the operation of electric motors.

BACKGROUND

The operation of electric motors can be characterized by their input frequencies (measured in Hertz (Hz)) and corresponding output speeds (measured in revolutions per minute (RPM)). The input frequency to a variable speed electric motor can be varied to change the output speed, which allows the same electric motor to be used with, e.g., different fan blades rated at different speeds and load points.

Fan blades may experience resonance at certain RPM. This resonance can be amplified into mechanical vibrations which may cause damage to the fan blades as well as unwanted noise. One solution is to avoid the RPM range associated with resonance by not allowing the electric motor to operate within that range. However, the electric motor may require an RPM within the disallowed RPM range in order to maintain a certain amount of power or torque, in which case disallowing the required RPM may result in even more noise or in the electric motor exhibiting "hunting" behavior, i.e., repeatedly jumping back and forth over the disallowed RPM range between a higher RPM that is not allowed and a lower RPM that is too slow. More specifically, a motor controller may command the electric motor to operate at a desired RPM that is just above the disallowed RPM range. However, load and/or temperature effects may prevent the electric motor from achieving the desired RPM, and may cause it to achieve an actual RPM that is within the disallowed RPM range, which then causes it to drop to an allowed actual RPM that is just below the disallowed RPM range. When the motor controller senses that the electric motor's actual RPM is substantially below the desired RPM, it commands the electric motor to return to the desired RPM which the electric motor cannot achieve. This cycle of jumping back and forth around the disallowed RPM range continues until the limiting operating conditions change so that the electric motor is able to achieve the desired RPM.

This background discussion is intended to provide information related to the present invention which is not necessarily prior art.

SUMMARY

Embodiments of the present invention solve the above-described and other problems and limitations by providing improved avoidance of one or more disallowed RPM ranges while still maintaining proper control over an electric motor operating in a limiting (e.g., power- or temperature-limiting) mode, including avoiding hunting behavior around the disallowed RPM ranges.

An electric motor system constructed in accordance with an embodiment of the present invention may broadly comprise an electric motor having a shaft for driving a load, and a motor control subsystem operable to control operation of the electric motor. The motor control subsystem may include a speed determiner operable to measure, estimate, or otherwise determine an actual speed value of the electric motor, a memory element containing a first lower speed value and a first upper speed value, which together define a first disallowed speed range for the electric motor, and a control unit in electrical communication with the speed determiner and the memory element. The control unit may be operable to calculate a desired speed value for the electric motor, wherein the desired speed value is not within the first disallowed speed range, and to generate and send an electrical signal to cause the electric motor to attempt to achieve the desired speed value, receive the determined actual speed value of the electric motor from the speed determiner, and determine whether the electric motor is unable to achieve the desired speed value due to a limiting condition and is repeatedly changing between a first actual speed value that is at or below the first lower speed value and a second actual speed value that is within the first disallowed speed range over a first predetermined period of time (i.e., that the electric motor is engaged in hunting behavior). If the control unit determines that the electric motor is engaged in such hunting behavior, the control unit may set a temporary speed limit for the electric motor at the first lower speed value for a second predetermined period of time. At the end of the second predetermined period of time, the control unit may remove the temporary speed limit to determine whether the limiting condition still exists.

In various implementations of this embodiment, the electric motor system may further include any one or more of the following additional features. The electric motor may be a three-phase, permanent magnet electric motor. The load may be a fan component of a heating and air-conditioning unit. The first predetermined time may be approximately between 20 seconds and 40 seconds, or approximately the time required for the electric motor to change between the first actual speed and the second actual speed between one time and three times. The second predetermined time may be approximately between 20 minutes and 40 minutes. The memory element may further contain a second lower speed value and a second upper speed value which together define a second disallowed speed range. In this case, the control unit may be operable to determine whether the electric motor is unable to achieve the desired speed value due to a limiting condition and is repeatedly changing between the first actual speed value that is within the second disallowed speed range and the second actual speed value that is at or below the second lower speed value over the first predetermined period of time, and if so, set the temporary speed limit for the electric motor at the second lower speed value for the second predetermined period of time.

The first disallowed speed range may be associated with a first flag in the memory element, and if the first flag is not set then the control unit may ignore the first disallowed speed range. The second disallowed speed range may also be associated with the first flag in the memory element, and if the first flag is set then the control unit may ignore the second disallowed speed range. Alternatively, the first disallowed speed range may be associated with a first flag in the memory element, and if the first flag is not set then the control unit may ignore the first disallowed speed range. The second disallowed speed range may be associated with a different second flag in the memory element, and if the second flag is not set then the control unit may ignore the second disallowed speed range.

Additionally, each of these implementations and embodiments may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
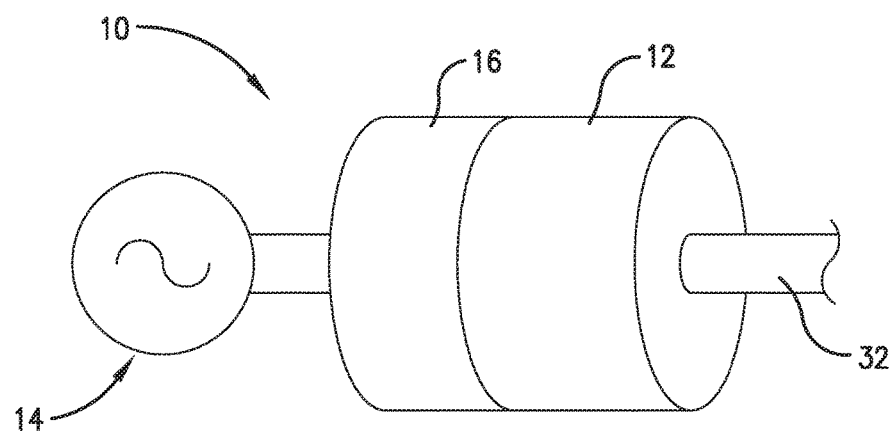
FIG. 1 is a schematic diagram of an electric motor system of the present invention.
Figure 2:
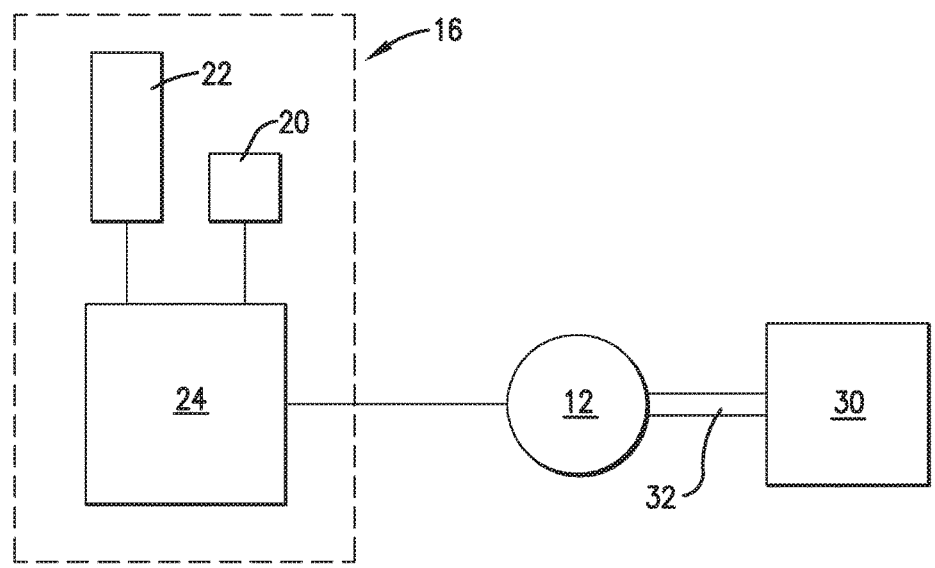
FIG. 2 is a block diagram of components of a motor control subsystem of the electric motor system of FIG. 1.

Broadly characterized, the present invention provides improved avoidance of one or more disallowed RPM ranges while still maintaining proper control over an electric motor operating in a limiting (e.g., power- or temperature-limiting) mode, including avoiding hunting behavior around the disallowed RPM ranges. Referring to the figures, an electric motor system 10 constructed in accordance with the present invention is shown. Referring to FIGS. 1 and 2, in an embodiment of the present invention, the electric motor system 10 may broadly comprise an electric motor 12; a power source 14; and a motor control subsystem 16 including a speed sensor 20, one or more memory elements 22, and a control unit 24.

The electric motor 12 may be any suitable variable speed electric motor driving any appropriate load 30 via a shaft 32. The load 30 may be, for example, a fan or a pump which may be part of a heating and air-conditioning unit, such as a commercial blower, or an appliance, such as a washing machine or a clothes dryer, which may include additional electrical or mechanical components not described herein. In one implementation, the electric motor 12 may be a variable speed, three phase, permanent magnet electric motor driving a condenser fan 30 in a heating and air-conditioning unit. The power source 14 may be any suitable residential, commercial, or other source of power.

Figure 3:
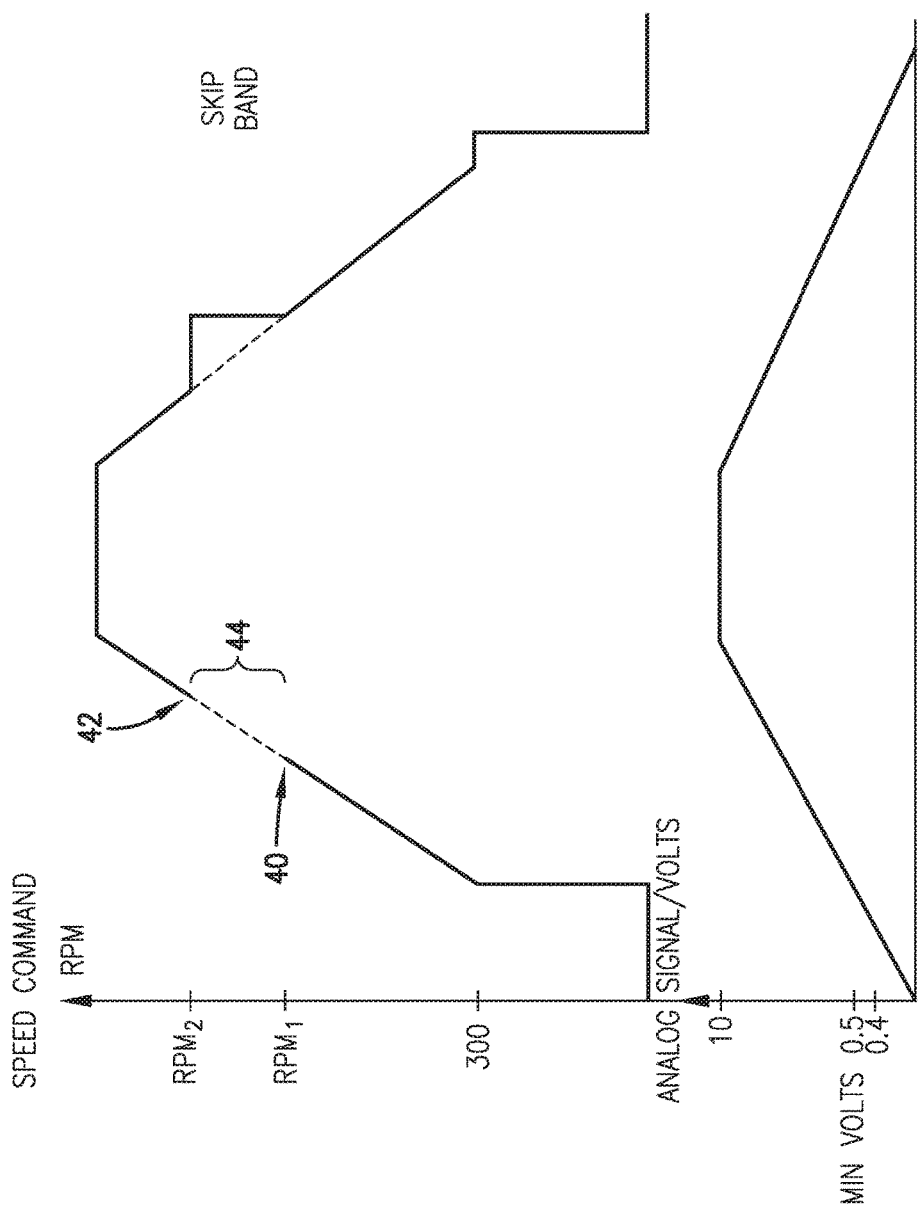
FIG. 3 is a plot of input voltage that references a speed command to an electric motor component of the motor control system of FIG. 1 and corresponding output speed of the electric motor component.

The motor control subsystem 16 may be broadly operable to control operation of the electric motor 12, including receiving power from the power source 14 and generating a driving waveform to drive the electric motor 12. The speed sensor 20 may be operable to measure or otherwise determine an actual speed value of the electric motor 12. In one implementation, the speed sensor 20 may be located on the shaft 32 of the electric motor 12, and may take any suitable form, including mechanical, electrical (e.g., a Hall effect sensor), or optical. Alternatively, the speed sensor may be replaced by a sensorless method of estimating or otherwise determining the speed of the electric motor 12. Referring also to FIG. 3, the one or more memory elements 22 may contain a first lower speed value 40 and a first upper speed value 42, which together define a first disallowed speed range 44 for the electric motor 12. The one or more memory elements 20 may take any suitable form, including one or more electrically erasable programmable read only memories (EEPROMs).

The control unit 24 is in electrical communication with the speed sensor 20 and the one or more memory elements 22, and operable to receive inputs therefrom and to generate and send command signals based thereon for controlling operation of the electric motor 12. The control unit 24 may take any suitable form, including only or primarily hardware components, only or primarily software components, or a combination of hardware and software components.

Figure 4:
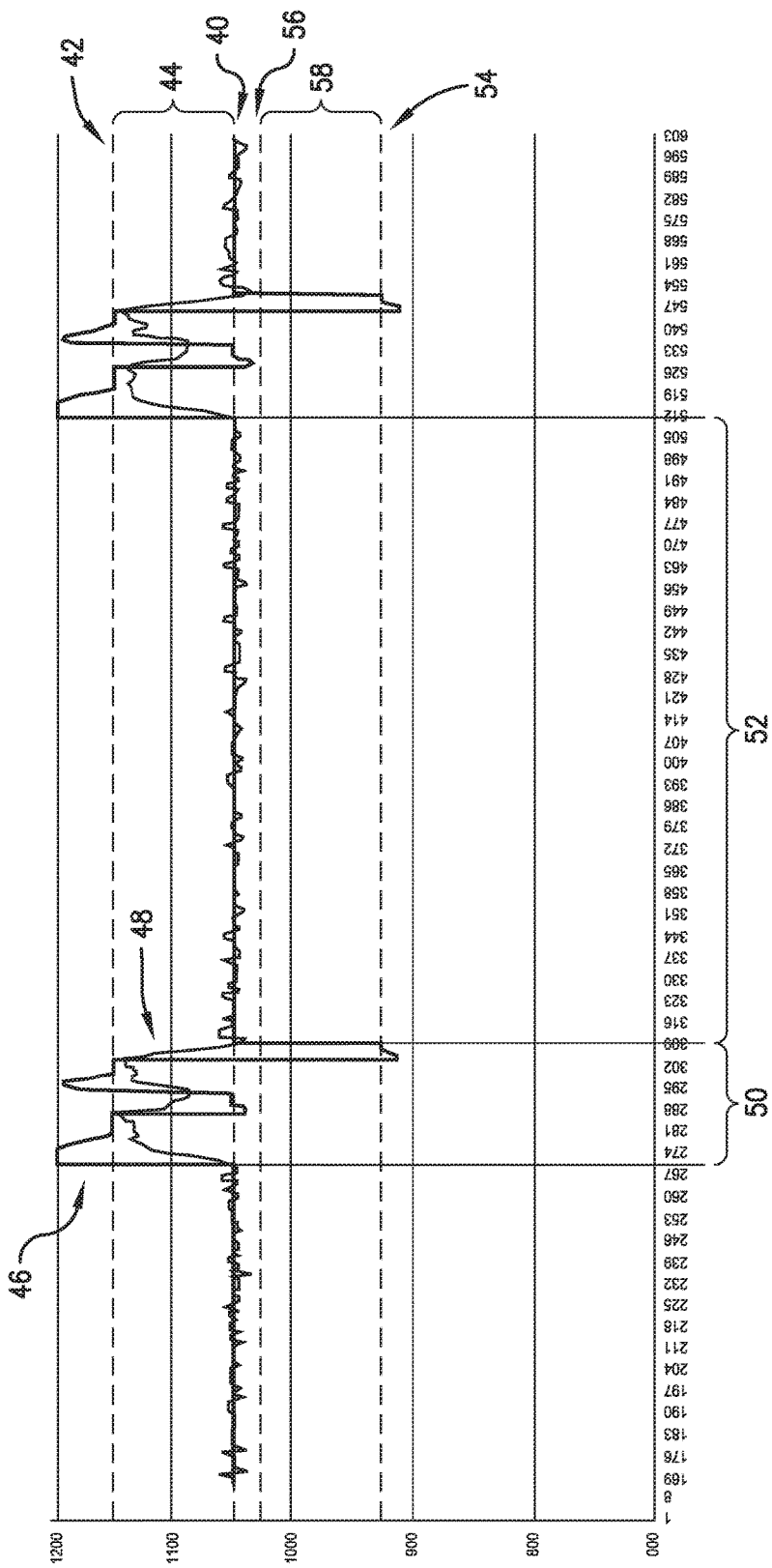
FIG. 4 is a plot of a speed command signal from the motor control subsystem and an actual speed of the electric motor of the electric motor system of FIG. 1 over time.

In particular, referring also to FIG. 4, the control unit 24 may be operable to calculate a desired speed value for the electric motor 12, wherein the desired speed value is not within the disallowed speed range, and to generate and send a speed command signal 46 to cause the electric motor 12 to attempt to achieve the desired speed value. The control unit 24 may be further operable to receive the measured actual speed value 48 of the electric motor 12 from the speed sensor 20, and to determine whether the electric motor 12 is unable to achieve the desired speed value due to a limiting condition and is engaging in hunting behavior, i.e., repeatedly changing between a first actual speed value that is at or below the first lower speed value and a second actual speed value that is within the first disallowed speed range 44 over a first predetermined period of time 50. If the electric motor 12 is engaging in hunting behavior, the control unit 24 may be further operable to set a temporary speed limit for the electric motor 12 at the first lower speed value 40 for a second predetermined period of time 52. The control unit 24 may be further operable to remove the temporary speed limit at the end of the second predetermined period of time 52 in order to determine whether the limiting condition still exists (as evidenced by the electric motor 12 continuing to engage in hunting behavior), and if so, repeat the foregoing process.

As mentioned, the limiting condition may be, e.g., power or temperature effects which prevent the electric motor 12 from achieving the desired speed value. The first predetermined period of time 50 may be approximately between 20 seconds and 40 seconds, or approximately 30 seconds, or approximately the time required for the electric motor 12 to change between the first actual speed and the second actual speed between one time and three times (i.e., sufficient time to confirm that the electric motor 12 is engaging in hunting behavior). The second predetermined period of time 52 may be approximately between 20 minutes and 40 minutes, or 30 minutes (i.e., sufficient time in which a limiting condition might change).

In one implementation, the electric motor system 10 may be operable to avoid multiple RPM ranges. For example, the one or more memory elements 22 may further contain a second lower speed value 54 and a second upper speed value 56 which together define a second disallowed speed range 58. In this implementation, the control unit 24 may be further operable to determine whether the electric motor 12 is unable to achieve the desired speed value due to a limiting condition and is repeatedly changing between the first actual speed value that is within the second disallowed speed range 58 and the second actual speed value that is at or below the second lower speed value 54 over the first predetermined period of time 50, and if so, set the temporary speed limit for the electric motor 12 at the second lower speed value 54 for the second predetermined period of time 52. Thus, the additional disallowed RPM ranges may be treated the same or similar to the first disallowed RPM range.

Furthermore, when the electric motor system 10 is operable to avoid multiple disallowed RPM ranges, an operator of the system 10 may be allowed to enable one or more of the RPM ranges 44,58 and disable others, wherein the control unit 24 may ignore any disabled disallowed RPM ranges 44,58. For example, in a first implementation, the first disallowed speed range 44 may be associated with a first flag in the memory element 22, and if the first flag is not set then the control unit 24 may ignore the first disallowed speed range 44, and the second disallowed speed range 58 may also associated with the same first flag in the memory element 22, and if the first flag is set then the control unit 24 may ignore the second disallowed speed 58 range. In a second implementation, the first disallowed speed range 44 may be associated with a first flag in the memory element 22, and if the first flag is not set then the control unit 24 may ignore the first disallowed speed range 44, and the second disallowed speed range 58 may be associated with its own second flag in the memory element 22, and if the second flag is not set then the control unit 24 may ignore the second disallowed speed range 58. For example, the first disallowed speed range 44 may be stored in EEPROM locations 52 and 54, and the second disallowed speed range 58 may be stored in EEPROM locations 192 and 194. The disallowed speed ranges 44,58 may be enabled or disabled by a high byte and a low byte in EEPROM location 190, wherein if the high byte in location 190 equals hA5 then the first disallowed speed range 44 is disabled and ignored by the control unit 24 and if the lower byte equals hA5 then the second disallowed speed range 58 is disabled and ignored.

Figure 5:
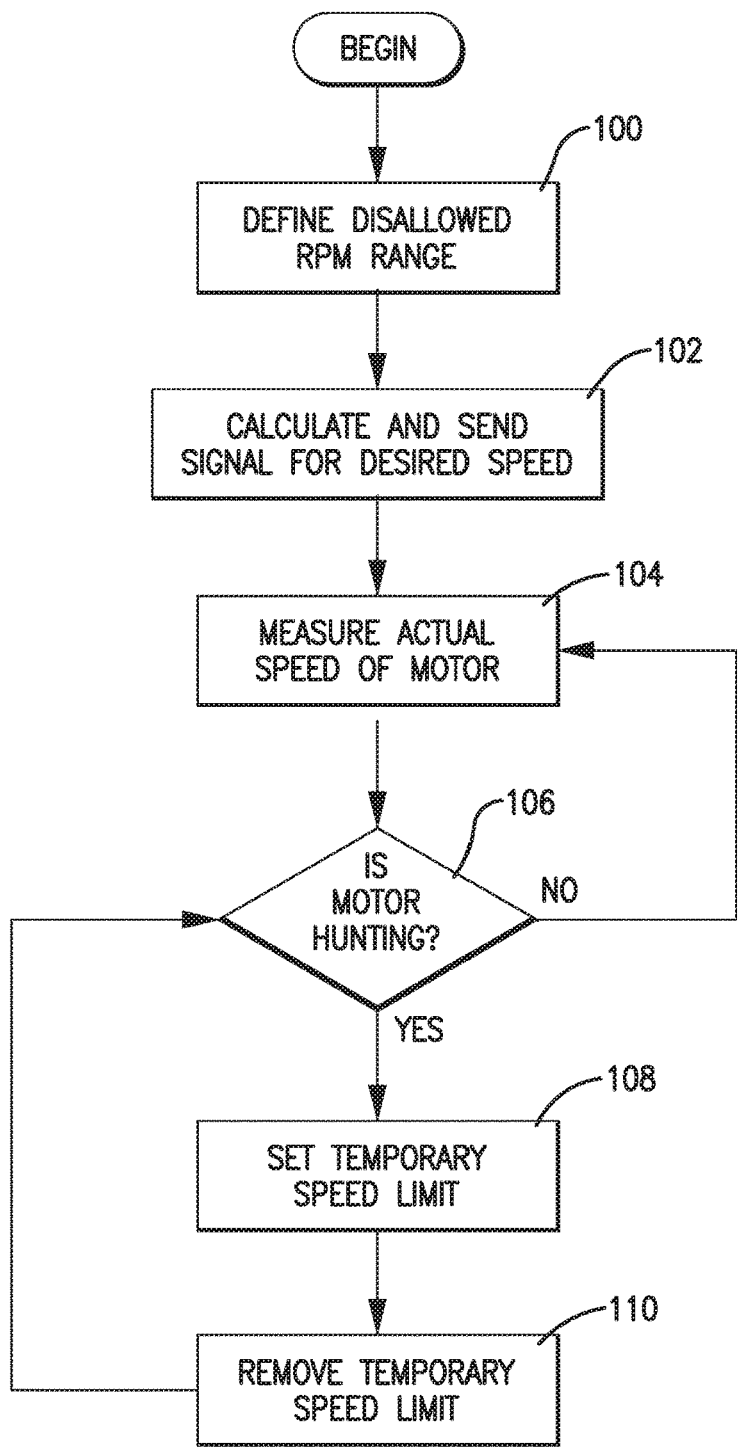
FIG. 5 is a flow diagram of steps involved in the operation of the electric motor system of FIG. 1.

In operation, an embodiment of the electric motor system 10 of the present invention may function substantially as follows. Referring to FIG. 5, the first disallowed speed range 44 for the electric motor 12 is defined by storing in the memory element 22 the first lower speed value 40 and the first upper speed value 42, as shown in step 100. The control unit 24 calculates a desired speed value for the electric motor 12, wherein the desired speed value is not within the first disallowed speed range 44, and the control unit 24 generates and sends an electrical speed command signal to cause the electric motor 12 to attempt to achieve the desired speed value, as shown in step 102. The speed sensor 20 measures the actual speed value 48 of the electric motor 12, as shown in step 104. The control unit 24 determines whether the electric motor 12 is unable to achieve the desired speed value due to a limiting condition and is repeatedly changing between a first actual speed value that is at or below the first lower speed value 40 to a second actual speed value that is within the first disallowed speed range 44 (i.e., is engaged in hunting behavior) over the first predetermined period of time 50, as shown in step 106. If the electric motor 12 is engaged in hunting behavior, then the control unit 24 sets the temporary speed limit for the electric motor 12 at the lower speed value 40 for the second predetermined period of time 52, as shown in step 108. The control unit 24 removes the temporary speed limit at the end of the second predetermined period of time 52, as shown in step 110, to determine whether the limiting condition still exists (i.e., whether the electric motor 12 returns to hunting behavior, as shown in step 106). If the electric motor 12 returns to hunting behavior after the second predetermined period of time 52, then the process repeats by returning to step 108.

A second (and subsequent) disallowed speed range 58 may be defined for the electric motor by storing in the memory element 22 the second lower speed value 54 and a second upper speed value 56, as shown in step 200. The control unit 24 may treat this second disallowed speed range 58 substantially similar to or the same as the first disallowed speed range 44.

Figure 6:
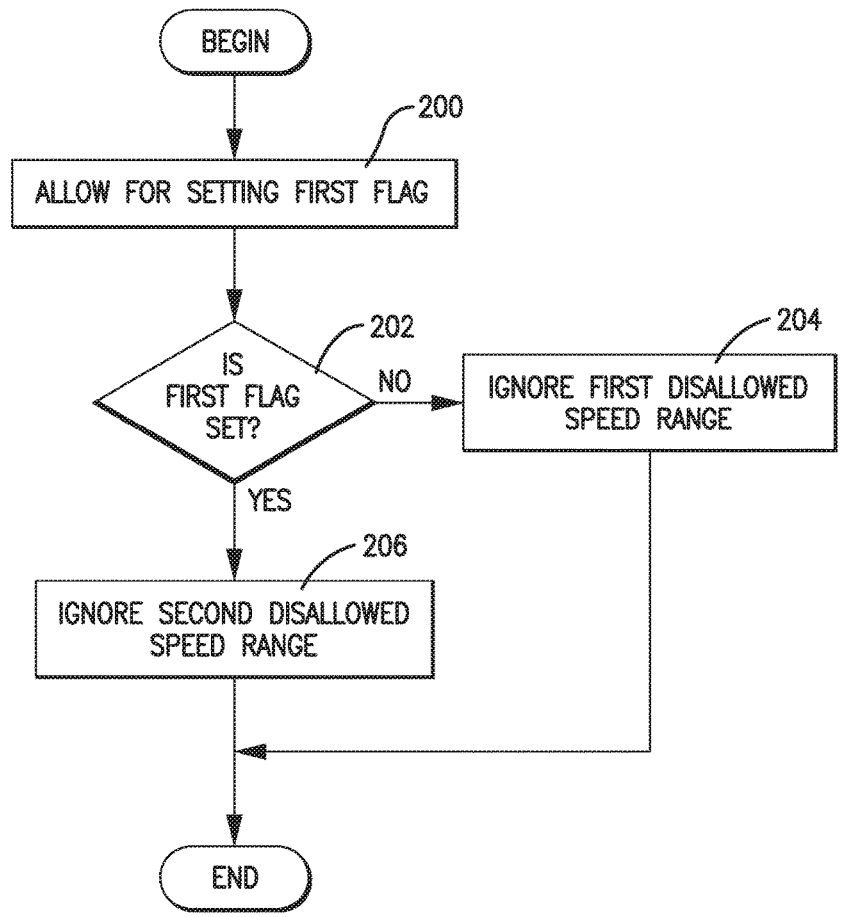
FIG. 6 is a flow diagram of additional steps involved in the operation of a first implementation of the electric motor system of FIG. 1.
Figure 7:
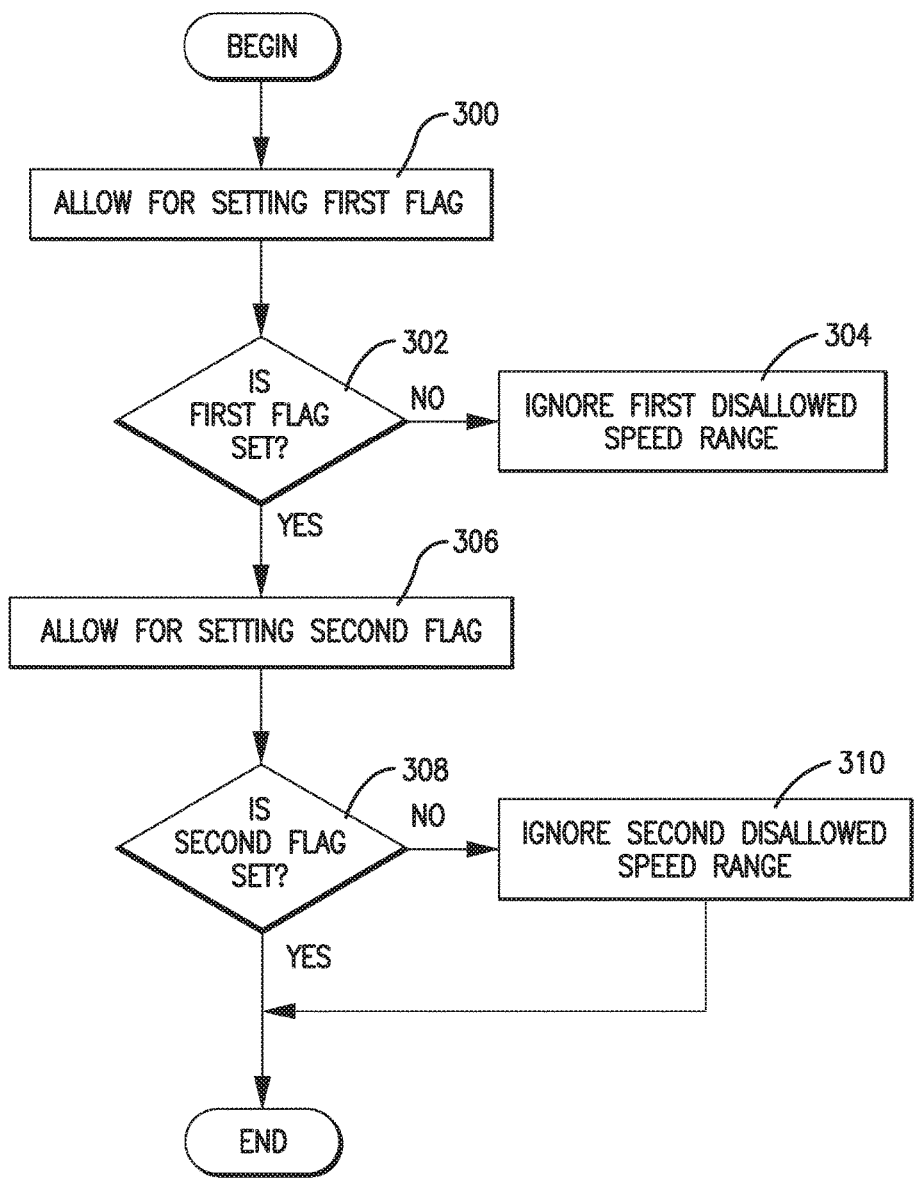
FIG. 7 is a flow diagram of additional steps involved in the operation of a second implementation of the electric motor system of FIG. 1.

Referring also to FIGS. 6 and 7, the first disallowed speed range 44 may be associated with the first flag in the memory element 22, and the system 10 may allow for setting the first flag, as shown in step 200. The control unit 24 may determine whether the first flag is set or not, as shown in step 202. If the first flag is not set, then the control unit 24 may ignore the first disallowed speed range 44, as shown in step 204, and if the first flag is set, then the control unit 24 may ignore the second disallowed speed range 58, as shown in step 206. Alternatively, the first disallowed speed range 44 may be associated with the first flag in the memory element 22, and the system 10 may allow for setting the first flag, as shown in step 300. Similarly, the second disallowed speed range may be associated with the second flag in the memory element 22, and the system 10 may allow for setting the second flag, as shown in step 306. The control unit 24 may determine whether the first flag is set, as shown in step 302, and if the first flag is not set then the control unit may ignore the first disallowed speed range 44, as shown in step 304. Similarly, the control unit 24 may determine whether the second flag is set, as shown in step 308, and if the second flag is not set then the control unit 24 may ignore the second disallowed speed range 58, as shown in step 310.

For example, if the control unit 24 has calculated and commanded a desired electric motor speed of 940 RPM, but due to a limiting condition the electric motor 12 actually operates at 930 RPM, and a disallowed RPM range has been established between 900 and 935 RPM such that the electric motor 12 begins several cycles of hunting across the disallowed range, then the control unit 24 may set the maximum RPM at 900 RPM for 30 minutes. At the end of the 30 minute period, the control unit 24 may reset the maximum RPM and reassert the command signal for 940 RPM. If the electric motor 12 begins hunting again, then the process repeats.

It will be understood that references in the foregoing description to "avoiding" or "skipping" a disallowed speed range 44,58 mean not commanding the electric motor 12 to achieve and hold a particular speed value within the disallowed speed range and, when necessary, moving relatively quickly through those disallowed speed ranges 44,58.

Thus, the present invention provides advantages over the prior art, including that it provides improved avoidance of one or more disallowed RPM ranges 44,58 while still maintaining proper control over the electric motor 12 operating in a limiting (e.g., power- or temperature-limiting) mode, including avoiding hunting behavior around the disallowed ranges 44,58.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system comprising:
   an electric motor having a shaft for driving a load; and
   a motor control subsystem configured to control operation of the electric motor, the motor control subsystem including—
      a speed determiner configured to determine an actual speed value of the electric motor,
      a memory element containing a first lower speed value and a first upper speed value which together define a first disallowed speed range for the electric motor, and
      a control unit in electrical communication with the speed determiner and the memory element, and configured to—
         calculate a desired speed value for the electric motor, wherein the desired speed value is not within the first disallowed speed range, and to generate and send an electrical signal to cause the electric motor to attempt to achieve the desired speed value,
         receive the actual speed value of the electric motor from the speed determiner,
         determine whether the electric motor is unable to achieve the desired speed value due to a limiting condition and is repeatedly changing between a first actual speed value that is at or below the first lower speed value and a second actual speed value that is within the first disallowed speed range over a first predetermined period of time,
         if so, set a temporary speed limit for the electric motor at the first lower speed value for a second predetermined period of time, and
         at the end of the second predetermined period of time, remove the temporary speed limit.

2. The electric motor system as set forth in claim 1, wherein the electric motor is a three-phase permanent magnet electric motor.

3. The electric motor system as set forth in claim 1, wherein the load is a fan component of a heating and air-conditioning unit.

4. The electric motor system as set forth in claim 1, wherein the first predetermined time is approximately between 20 seconds and 40 seconds.

5. The electric motor system as set forth in claim 1, wherein the first predetermined time is approximately the time required for the electric motor to change between the first actual speed and the second actual speed one to three times.

6. The electric motor system as set forth in claim 1, wherein the second predetermined time is approximately between 20 minutes and 40 minutes.

7. The electric motor system as set forth in claim 1, wherein the memory element further contains a second lower speed value and a second upper speed value which together define a second disallowed speed range, wherein the control unit is configured to—
   determine whether the electric motor is unable to achieve the desired speed value due to a limiting condition and is repeatedly changing between the first actual speed value that is within the second disallowed speed range and the second actual speed value that is at or below the second lower speed value over the first predetermined period of time, and
   if so, set the temporary speed limit for the electric motor at the second lower speed value for the second predetermined period of time.

8. A motor control system configured to control operation of an electric motor having shaft for driving a load, the motor control system comprising:
   a speed sensor configured to measure an actual speed value of the electric motor;
   a memory element containing a first lower speed value and a first upper speed value which together define a first disallowed speed range for the electric motor, and further containing a second lower speed value and a second upper speed value which together define a second disallowed speed range; and
   a control unit in electrical communication with the speed sensor and the memory element, and configured to—
      calculate a desired speed value for the electric motor, wherein the desired speed value is not within the first or second disallowed speed ranges, and to generate and send an electrical signal to cause the electric motor to attempt to achieve the desired speed value,
      receive the actual speed value of the electric motor from the speed sensor,
      determine whether the electric motor is unable to achieve the desired speed value due to a limiting condition and is repeatedly changing between a first actual speed value that is at or below the first lower speed value and a second actual speed value that is within the first disallowed speed range over a first predetermined period of time, wherein the first predetermined period of time is approximately the time required for the electric motor to change between the first actual speed and the second actual speed between one time and three times, and
      if so, set a temporary speed limit for the electric motor at the first lower speed value for a second predetermined period of time, wherein the second predetermined period of time is approximately between twenty minutes and forty minutes, determine whether the electric motor is unable to achieve the desired speed value due to the limiting condition and is repeatedly changing between the first actual speed value that is at or below the second lower speed value and the second actual speed value that is within the second disallowed speed range over the first predetermined period of time, if so, set the temporary speed limit for the electric motor at the second lower speed value for the second predetermined period of time, and at the end of the second predetermined period of time, remove the temporary speed limit.

9. The motor control system as set forth in claim 8, wherein the electric motor is a three-phase permanent magnet electric motor.

10. The motor control system as set forth in claim 8, wherein the load is a fan component of a heating and air-conditioning unit.

11. A method of controlling an electric motor, the method comprising the steps of:
   (1) defining a first disallowed speed range for the electric motor by storing in a memory a first lower speed value and a first upper speed value;
   (2) determining an actual speed value of the electric motor;
   (3) calculating a desired speed value for the electric motor, wherein the desired speed value is not within the first disallowed speed range, and generating and sending an electrical signal to cause the electric motor to attempt to achieve the desired speed value;
   (4) receiving the actual speed value of the electric motor;
   (5) determining whether the electric motor is unable to achieve the desired speed value due to a limiting condition and is repeatedly changing between a first actual speed value that is at or below the first lower speed value to a second actual speed value that is within the first disallowed speed range over a first predetermined period of time;
   (6) if so, setting a temporary speed limit for the electric motor at the lower speed value for a second predetermined period of time; and
   (7) at the end of the second predetermined period of time, removing the temporary speed limit.

12. The method as set forth in claim 11, wherein the electric motor is a three-phase permanent magnet electric motor.

13. The method as set forth in claim 11, wherein the first predetermined time is approximately between 20 seconds and 40 seconds.

14. The method as set forth in claim 11, wherein the first predetermined time is approximately the time required for the electric motor to chance between the first actual speed and the second actual speed one to three times.

15. The method as set forth in claim 11, wherein the second predetermined time is approximately between 20 minutes and 40 minutes.

16. The method set forth in claim 11, further including the steps of—
   defining a second disallowed speed range for the electric motor by storing in a memory a second lower speed value and a second upper speed value;
   determining whether the electric motor is unable to achieve the desired speed value due to the limiting condition and is repeatedly changing between the first actual speed value that is at or below the second lower speed value to the second actual speed value that is within the second disallowed speed range over the first predetermined period of time; and
   if so, setting the temporary speed limit for the electric motor at the second lower speed value for the second predetermined period of time.

* * * * *